United States Patent

Van den Wittenboer

[11] Patent Number: 5,922,835
[45] Date of Patent: Jul. 13, 1999

[54] METHOD FOR COMPACTING EXPANDED POLYSTYRENE

[76] Inventor: Jan Van den Wittenboer, P.C. Hooftlaan 279, NL-7552 HE Hengelo, Netherlands

[21] Appl. No.: 08/615,294
[22] PCT Filed: Sep. 26, 1994
[86] PCT No.: PCT/NL94/00232
§ 371 Date: Jun. 17, 1996
§ 102(e) Date: Jun. 17, 1996
[87] PCT Pub. No.: WO95/09196
PCT Pub. Date: Apr. 6, 1995

[30] Foreign Application Priority Data

Sep. 27, 1993 [NL] Netherlands ............... 9301660

[51] Int. Cl.⁶ ...................................... C08J 11/08
[52] U.S. Cl. ................ 528/497; 528/491; 528/493; 528/494; 528/495; 528/496; 528/498; 528/499; 521/47
[58] Field of Search ................... 521/44.5, 918, 521/47; 528/493, 497, 498, 494, 491, 495, 496, 499

[56] References Cited

FOREIGN PATENT DOCUMENTS

| | | |
|---|---|---|
| 0563532 | 10/1993 | European Pat. Off. . |
| 2303754 | 8/1974 | Germany . |
| 3113125 | 10/1982 | Germany . |
| 3741777 | 3/1989 | Germany . |
| 4215113 | 11/1993 | Germany . |

OTHER PUBLICATIONS

Derwent Publications Ltd., London, GB; AN 78–28132A [15] & JP,A,53 023 892, Mar. 4, 1978.

Derwent Publications Ltd., London, GB; AN 78–62714A [35] & JP,A,53 085 870, Jul. 28, 1978.

*Primary Examiner*—Fred Teskin
*Attorney, Agent, or Firm*—Webb Ziesenheim Logsdon Orkin & Hanson, P.C.

[57] ABSTRACT

The inventions refers to a method of compacting expanded polystyrene (EPS). EPS, especially in the state of waste, constitutes a problem due to its voluminous nature. High logistic costs are connected with this voluminous nature and therefore it is difficult to realize an efficient recycling of EPS. This invention aims to offer a solution to this logistic problem by transforming the waste EPS in a compacted mass with semi-fluid properties, by bringing the EPS into contact with a liquid that has such a composition that the semi-fluid compacted mass itself is not miscible with the liquid that causes this phenomenon of compacting. To that end the liquid is composed of at least one component with solving power in respect of polystyrene and at least one component without solving power in respect of polystyrene.

9 Claims, No Drawings

METHOD FOR COMPACTING EXPANDED POLYSTYRENE

FIELD OF THE INVENTION

The invention relates to a method of compacting expanded polystyrene (EPS) as well as the processing of the thus obtained compacted mass.

BACKGROUND OF THE INVENTION

EPS is originated from the addition of blowing agents to polystyrene (PS) in order to obtain the PS as a foamed structure: a matrix comprised of fixed or flexible, coherent structural elements of PS that constitute spatial open or closed cells or cavities in which air and/or blowing agents are contained, whether free or entrapped.

EPS has found widespread use in insulation of heat; absorbtion of noise, vibration and shocks; light-weight-structured material in sandwich panels and transport packages; foamed packaging chips; etc.

The voluminous nature of EPS, especially in the state of waste, creates a problem in that high logistic costs per ton polymer are involved in handling and transport. A truckload of EPS, having a mean density of 25 kg/m$^3$, only contains 800 to 1000 kg PS.

A reduction of volume, for instance, can be obtained by mechanical means like pressing or treatment between compactor rolls. This type of equipment, especially the roll compactor, is precious and takes relative large amounts of energy to do the job. Especially for the elastic types of foam, mechanical systems perform less efficiently. Furthermore it is difficult to keep polluting blowing agents like CFK's, present in the older types of EPS, from entering the environment during the compacting process.

Methods, among others, are known from the literature in which polymers are brought into contact with solvents for those polymers. These methods lead to more or less homogeneous solutions of either low or high viscosity, mainly applied as adhesives. DE-C1 37 41 777 is related to waste PS that, in contact with solvents, leads to PS solutions with adhesive properties. DE-A1 31 13 125 is related to EPS that, in contact with "stain remover", leads to a solution with adhesive properties. DE-A1 23 03 754 is related to EPS that, in contact with chlorinated hydrocarbons, in particular highly chlorinated hydrocarbons and at higher temperatures, leads to sticky masses with adhesive properties.

A need remains to convert waste EPS in an effective way in a form that, on the one hand, leads to economic advantage by lowering logistic costs related to collecting, handling, storage and transport and, on the other hand, offers the opportunity for reprocessing, whether physically to PS, or chemically to monomer styrene and other raw materials, in that a certain amount of contamination and incompatibility due to the presence of sticker labels, printing ink, other polymers, adhering sand, organic matter, etc. is not objectionable.

SUMMARY OF THE INVENTION

It is discovered that the problem can be solved by bringing the EPS in contact with a liquid composed of at least one component with solving power in respect of polystyrene and at least one component without solving power in respect of polystyrene.

DETAILED DESCRIPTION OF THE INVENTION

The present invention is a method of compacting EPS by bringing the EPS in contact with a liquid composed of at least one component with solving power in respect of polystyrene and at least one component without solving power in respect of polystyrene. The following definitions apply to the invention:

The phrase "component with solving power in respect of a polymer" means that a component has solving power if, in the liquid state, it weakens the bonds between the molecules of a submerged polymer in such a way that these molecules lose their mutual coherence and as a final consequence a one-phase system arises with fluid or semi-fluid properties, in which the molecules are, more or less, homogeneously distributed over the entire system volume. Things to be considered include the temperature range in which the method is applied. In the examples "a component with solving power in respect of polystyrene" is simply referred to as "a solver". The solver of polystyrene may be (i) an aromatic hydrocarbon constituted of 1, 2, 3 or 4 benzene rings with or without substitution in a nucleus or side chain thereof and homologues thereof; (ii) an aromatic compound with keto-, ether- or ester structure; (iii) a heterocyclic compound with one or more oxygen atoms in the ring; (iv) an acyclic compound; (v) an aliphatic ketone, ether or ester;(vi) an aliphatic unsaturated compound or (vii) a halogenated hydrocarbon.

The phrase "component without solving power in respect of a polymer" means that component has no solving power if, in the liquid state, it is not capable of weakening the bonds between the molecules of a submerged polymer in such a way that these molecules lose their mutual coherence. What remains after prolonged time is a 2-phase system comprised of an inactive liquid phase and an unaltered solid phase that may be somewhat swollen at the most due to the imbibition of liquid molecules in the polymer matrix. In the examples "a component without solving power in respect to polystyrene" is simply referred to as "a non-solver". The non-solver of polystyrene may be (i) water, (ii) an aliphatic saturated monohydric alcohol or (iii) an aliphatic saturated hydrocarbon.

It is the embodiment of the invention that by a convenient choice of the composing components and their mutual ratios the liquid obtains the following properties. EPS, contacted with it, shrivels up but does not solve, on the contrary, what arises is a 2-phase system characterized by the existence of a polymer phase that is very strongly reduced in volume which phase exits in a semifluid pasty or doughy state and that does not take up more liquid than necessary for the existence of said phase and by the existence of a polymer free liquid phase that, more or less, keeps the full power of absorbing freshly added EPS in an unaltered fast rate. This is in contradistinction to real solvents in which the rate of take-up is fast in the beginning but which rate slows down gradually as the polymer concentration of the solution increases.

There is a triangular interaction between polymer, solver component(s) and non-solver component(s). The solver molecules, on one hand, exhibit strong interaction with the polymer molecules, on the other hand, they show interactions with the non-solver molecules. The non-solver molecules, however, avoid interaction with the polymer molecules. The stable situation is not the homogeneous molecular distribution over the entire system volume but a limitation of the triangular interactions to a part of the system's volume that is as small as possible and that, therefore, has maximum polymer concentration. In this situation the solver molecules are able to abolish the matrix structure of the polymer enabling said polymer to pass into the liquid state, but the presence of the non-solver molecules prevents a homogeneous distribution over the entire system volume.

The properties of the semifluid polymer phase are adjustable by variation of the ratios of the composing components. At maximum percentage of a solver component the polymer phase has the lowest viscosity and to some extent exhibits sticky properties. The quantity of this percentage depends upon the choice of the components that compose the system. In this situation the compacting rate is at a maximum related to the chosen system. At maximum percentage of a non-solver component the polymer phase has the highest viscosity but no tendency to stickiness. The quantity of this percentage depends upon the choice of the components that compose the system. In this situation the compacting rate is at a minimum related to the chosen system. It is always possible to find a working range within those limits in which the polymer phase is optimal in respect of compacting rate, pumpability and tendency for the equipment to become filthy. The position of working range and limits are dependent on the temperature at which the method is carried out. In general, at higher temperatures there is a shift towards a higher share of non-solver component(s).

The invention of the 2-phase system has the following advantages, namely:

A. In respect of the solvent-based systems.
1. The asorbtion of EPS proceeds in an unaltered fast rate from the first up to the last addition.
2. A location for compacting can always be disposed of the compact polymer phase at its maximum concentration without the need for total consumption of the liquid first.
3. A tank-vehicle can, by pushing aside of phases, with the use of only one tank compartment withdraw the polymer phase and add back the make-up of compacting liquid at the same time and vice versa.
4. A compacting unit is preferably provided with a sieve on which the EPS is dumped. The compacted polymer phase sinks through the mesh while the coarse contaminations remain on top of the sieve without degenerating to a sticky mass.
5. The polymer concentration being at a maximum ensures that in the connected processing the amount of liquid to be recovered is at a minimum.
6. The stickiness of the compacted mass being at a minimum is advantageous in the performing of the method, the connected transport and the further processing of the said mass.

B. In respect of mechanical systems in general.
7. The compacted polymer phase has good pumpability and can be withdrawn from solid contaminations by filtering.
8. Blowing agents, whenever present, can be solved in the polymer phase and thus be kept out of the environment.
9. The invention makes possible a wide choice of the composing components, depending upon the market situation in respect of availability of components, the scale of performing the compacting method, the level of fire risk, operative environmental and safety requirements and the kind of the further processing of the compacted mass.
10. The compacted mass is suitable for physical processing to PS as well as for chemical processing to styrene monomer and other chemical materials.
11. By a suitable choice of the composing components of the liquid phase, these components can be recovered simply and nearly completely in the processing as stated above.

The purpose of the invention shall be illustrated in the following examples, and it will be clear that the scope of the invention includes more than what is made explicit in the examples.

EXAMPLES

Example 1

Concerns the effect of real solvents in respect of EPS.

To 100 gr methylethylketone, EPS is added. At first the EPS is absorbed by the liquid at a very fast rate, but, as the concentration of EPS in the solution rises the rate of absorbtion slows down progressively. In the end the process stops at 50–55 gr EPS absorbed. The highly viscous fluid mass exhibits very sticky properties. Yet from the first addition of EPS there is the origin of only one homogeneous phase in which the viscosity increases as more EPS is added. Comparable effects appear when use is made of, e.g., styrene, toluene, ethylacetate, methylisobutylketone, 1, 1, 1-trichloroethane, etc.

Example 2

Concerns the effect of a liquid comprised of one solver and one non-solver.

Acetone, as it is sold in technical quality, contains about 0.3% water. In this case there is the question of a system comprised of acetone being a solver and water being a non-solver. To 100 gr acetone of technical quality, EPS is added. The EPS is absorbed at a very fast rate, but, at present no homogeneous solution is obtained. A 2-phase system is produced including in one phase, a compact semifluid polymer phase which is highly viscous but nevertheless has good fluid properties and a second polymer-free liquid phase that is capable for absorbing EPS undiminished as fast as before. Since part of the liquid is needed to bring about the fluid polymer phase, the available polymer-free liquid diminishes as the addition of EPS continues. As soon as all the liquid is used up, a paste is obtained that contains 85 to 90 gr PS. This amount of PS has not been approached by whatever pure solvent system. The influence of water as a non-solver is extremely strong in this system as will be demonstrated in a later example.

Example 3

Concerns the effect of other liquid systems, also again comprised of only one solver and one non-solver.

1. To 90 gr methylethylketone, 10 gr water is added. EPS is added to the thus obtained liquid. Also in this case EPS is absorbed in the liquid at a fast rate and a 2-phase system is obtained comprised of a semifluid polymer phase and a polymer-free liquid phase, completely analogous with Example 2. The total amount of EPS added, 80 to 85 gr, is comparable to the amount as with Example 2.
2. Liquid comprised of 25% methanol (non-solver) and 75% methylethylketone (solver): a 2-phase system is obtained having a semifluid polymer phase and a polymer-free liquid phase.
3. Liquid comprised of 25% methanol (non-solver) and 75% ethylacetate (solver): a 2-phase system is obtained having a semifluid polymer phase and a polymer-free liquid phase.
4. Liquid comprised of 85% dioxane (solver) and 15% water (non-solver): a 2-phase system is obtained having a semifluid polymer phase and a polymer-free liquid phase.

Example 4

Concerns liquid systems comprised of one solver and more than one non-solver.

In all cases a 2-phase system is obtained characterized by a highly concentrated semifluid polymer phase and a polymer-free liquid phase to which EPS can be added until all liquid is used up.

1. Liquid comprised of 20% toluene (solver) and 80% refined spirit (mixture of saturated aliphatic hydrocarbons with boiling range 107° C. to 138° C. all of which are non-solvers).
2. Liquid comprised of 20% 1, 1, 1-trichloroethane (solver) and 80% refined spirit (mixture of saturated aliphatic hydrocarbons, all of which are non-solvers).
3. Concerned is an example that shows that a system component in the pure state that does not necessarily have to be a liquid. To 80 gr refined spirit (mixture of non-solvers) is added 20 gr naphthalene (solver) that has been solved in the refined spirit by heating to 50° C. After cooling to ambient temperature the liquid behaves according to the invention.
4. Liquid comprised of 85% refined spirit (non-solvers) and styrene (solver).

Example 5

Concerned are liquid systems that are composed of one non-solver and more than one solver.

In all cases a 2-phase system is obtained characterized by a highly concentrated polymer phase and a polymer-free liquid phase to which EPS can be added continuously until all liquid has been used up.

1. Liquid comprised of 50% isopropanol (non-solver), 20% toluene (solver) and 30% acetone (solver).
2. Liquid comprised of 10% water (non-solver), 30% styrene (solver) and 60% acetone (solver). This example clearly shows how the extremely strong influence of water to the solving power of acetone, as will be shown in Example 7, can be forced back by the addition of a second solver with very high affinity towards PS. 100 gr of this liquid absorbs some 70 to 75 gr EPS.

Example 6

Concerned are systems comprised of more than one non-solver and more than one solver.

All systems are characterized in that 2-phase systems are obtained according to the invention.

1. Liquid comprised of 50% refined spirit (non-solvers), 30% acetone (solver) and 20% toluene (solver).
2. Liquid comprised of 80% refined spirit (non-solvers) and 20% Shellsol A (a mixture of hydrocarbons that includes 98% aromatics and which aromatics all belong to the solvers). Shellsol A has a boiling range of 166° C. to 185° C. Liquid comprised of 40% Shellsol A (98% aromatics, all solvers) and 60% white spirit D (comprised of high boiling aliphatic hydrocarbons, all non-solvers). White spirit D has a boiling range from 162° C. to 197° C.

Example 7

Concerns the extreme influence of water (non-solver) in respect of acetone (solver) to the compacting power of this system.

1. Technical acetone contains 0.3% water. This system has been examined in Example 2 and it behaves completely according the invention.
2. Acetone whose water content is raised to 1.5%. This system behaves completely according to the invention, hardly slower and 100 gr liquid absorbs some 80 to 85 gr EPS.
3. Acetone whose water content is raised to 5%. This system still behaves according to the invention but its activity has been diminished to a large extent. Its activity is very slow and the obtained semifluid polymer phase has the consistency of dough that is hardly pumpable.
4. Acetone whose water content is raised to 15%. This system behaves completely inactive.
5. An example, at last, in which the water content of technical acetone has been lowered to less than 0.1% by drying over silica gel. In this case a borderline case has been obtained in which a 2-phase system still appears but the polymer phase has relatively low viscosity now and it also exhibits strong adhesive properties. The polymer phase is relatively transparent as compared to all other systems.

Example 8

Concerns the influence of ratios and temperature in respect of certain systems that are completely composed of hydrocarbons.

1. Shellsol A (mainly solvers) and white spirit D (totally non-solvers), at which only the ratio is examined. In all cases 100 gr liquid absorbs some 90 gr EPS.

35% solvers and 65% non-solvers. The process proceeds relatively slowly and the obtained polymer phase exists as a hardly pumpable dough that does not stick.

40% solvers and 60% non-solvers. The process proceeds faster and the polymer phase is more pumpable but still exhibits some tendency of stickiness.

45% solvers and 65% non-solvers. The system is optimal with respect of compacting rate, pumpability of polymer phase and acceptability of stickiness.

50% solvers and 50% non-solvers. The system behaves no longer in accordance with the invention. A homogeneous 1-phase system is obtained with strong adhesive properties.

2. The system styrene (solver) and refined spirit (non-solvers).

20% styrene in refined spirit. The process is extremely fast and the obtained polymer phase has a relatively low viscosity.

10% styrene in refined spirit. The process proceeds more slowly and the obtained polymer phase is highly viscous.

5% styrene in refined spirit. The process is very slow and the obtained polymer phase has the consistency of a tough dough.

5% styrene but the liquid is heated to 50° C. The process is as fast as in the case of 10% styrene and the obtained polymer phase has a viscosity comparable to that case.

3. The system naphthalene (solver) and refined spirit (non-solvers).
   a. 20% naphthalene and 50° C.: very fast with polymer phase of very low viscosity and highly adhesive.
   b. same as a. but at ambient temperature: less fast and strong, yet good pumpable dough with less stickiness.
   c. 10% naphthalene and 50° C.: very fast and better quality paste as with a.
   d. same as c. but at ambient temperature: slow process and tough dough.
   e. 5% naphthalene and 50° C.: fast process and sturdy paste with low stickiness.
   f. same as e. but at ambient temperature: very slow process and very tough dough, less useful system to perform the method.

Example 9

In this case a variant of the method is concerned in which a liquid according to the invention and comprised of hydrocarbons is emulgated in water.

To a liquid according to the invention, comprised of 20 gr Shellsol A and 80 gr refined spirit, 20 gr oleic acid is added. While stirring, this mixture is added to 300 gr water in which sufficient spirit of ammonia is present to build a stable yet non-foaming emulsion. The thus obtained emulsion is more fire-safe than the use of pure hydrocarbon mixtures and also absorbs EPS in that a milky-white homogeneous emulsion is obtained comprised of a countless number of microscopic systems that act according to the invention. The milky-white emulsion can be charged with EPS to saturation and nevertheless remains of low viscosity. After charge, the emulsion is broken by neutralizing the system with diluted hydrochloric acid. After a first coalescence that leads to a separation in a water phase and an organic phase, the latter again shows a phenomenon of coacervation in that the highly concentrated polymer phase separates from the polymer-free organic phase. This organic phase does not absorb any additional EPS and again can be emulgated with water containing ammonia. Apparently the oleic acid molecules with the saturated aliphatics have created a phase that is widely disposed of aromatics. When the aromatic content of this phase is adjusted, the emulsion again behaves in accordance with the invention.

Example 10

Concerned is the transport of paste and compacting liquid in one and the same tank component.

In general the polymer phases obtained according the invention have higher densities than the compacting liquid itself, causing the semifluid polymer phase to collect at the bottom of a tank compartment. This fact offers the opportunity to use only one tank compartment to transport both compacting liquid and polymer phase.

A transport vessel, total volume 30 ltrs, is filled with 15 ltrs compacting liquid. Next a collecting tank, having a storage of paste on its bottom, is connected to this vessel and well in such a way that both bottoms are communicating. The transport vessel is provided with a so called "floating inlet" that enables the compacting liquid to be transferred by pumping to the collecting tank in that the level of the suction inlet is automatically adapted to the liquid level in the transport vessel. Then the paste in the collecting tank is transferred by pumping to the transport vessel while at the same time a fresh supply of compacting liquid is transferred from transport vessel to collecting tank in an amount that compensates for the liquid withdrawn with the paste.

Example 11

Concerns the processing of the obtained compacted mass to PS.

20 kg of the polymer paste obtained in Example 4, sub 1 is sucked in by a screw pump and pressed through a filtering unit. Next the mass is transferred to a vacuum chamber by a conveyor screw during which passage the temperature of the mass is raised to over the melting temperature of PS, in order to degas the mass. The sucked off gases are condensed to recover the liquid. Next the degassed polymer is withdrawn from the degassing chamber by an extrusion screw and processed to granules for injection molding via pressing through a strandforming die.

Example 12

Concerns the processing of the obtained compacted mass to monomer styrene and other chemical materials.

To 400 gr technical acetone, 0.5% water being present in it, is added 360 gr EPS, being the maximum amount the liquid can absorb. 760 gr paste is obtained. From this, 570 gr is submitted to pyrolysis, from which 550 gr pyrolysis oil is obtained. By separation of this oil in a distillation column is obtained:

0.53 mass % acetone, fit for reuse in accordance with the invention, 23 mass % monomer styrene, 10 mass % other distillates with boiling points up to 155° C. and 14 mass % residue with boiling points over 155° C.

The thus obtained monomer styrene can be polymerized to clear PS conveniently.

I claim:

1. A method of compacting expanded polystyrene in which the expanded polystyrene is brought into contact with a liquid, wherein the liquid is composed of a solver of polystyrene and a non-solver of polystyrene, and in which the ratio of these components is such that the liquid compacts the expanded polystyrene and, with the thus compacted polystyrene, builds a viscous paste or dough that has the property of distinguishing itself from the liquid as a separate and immiscible phase.

2. The method of claim 1, wherein said liquid comprises about 1 wt % to 99.9 wt % of said solver of polystyrene.

3. The method of claim 1, wherein said liquid comprises about 0.1 wt % to 99 wt % of said non-solver of polystyrene.

4. The method of claim 1, wherein said solver of polystyrene is selected from the group consisting of an aromatic hydrocarbon constituted of 1, 2, 3 or 4 benzene rings with or without substitution in a nucleus or side chain thereof and homologues thereof;

an aromatic compound with keto-, ether- or ester structure;

a heterocyclic compound with one or more oxygen atoms in the ring;

an alicyclic compound;

an aliphatic ketone, ether or ester;

an aliphatic unsaturated compound; and a halogenated hydrocarbon.

5. The method of claim 1, wherein said non-solver of polystyrene is selected from the group consisting of water, an aliphatic saturated monohydric alcohol, and an aliphatic saturated hydrocarbon.

6. The method of claim 1, wherein said liquid comprises hydrocarbons and in which one or more of the solvers of polystyrene is selected from the group consisting of an aromatic hydrocarbon and an alicyclic hydrocarbon while one or more of the non-solvers of polystyrene is an aliphatic hydrocarbon.

7. The method of claim 1, wherein the liquid is emulsified in water such that when the resulting emulsion is brought into contact with the expanded polystyrene, the expanded polystyrene becomes absorbed by the emulsion and the emulsion is broken up such that the paste or dough becomes separated from the liquid.

8. The method of claim 1, wherein the solver of polystyrene is acetone, the non-solver of polystyrene is water, and the water is present in the liquid in the amount of about 0.1 wt % to 10 wt %.

9. The method of claim 1, wherein the liquid is composed of a plurality of solvers of polystyrene, said plurality of solvers comprising at least 50 wt % acetone and up to 40 wt % aromatic hydrocarbons and wherein said non-solver of polystyrene comprises at least 1 wt % water.

* * * * *